United States Patent Office 2,876,849
Patented Mar. 10, 1959

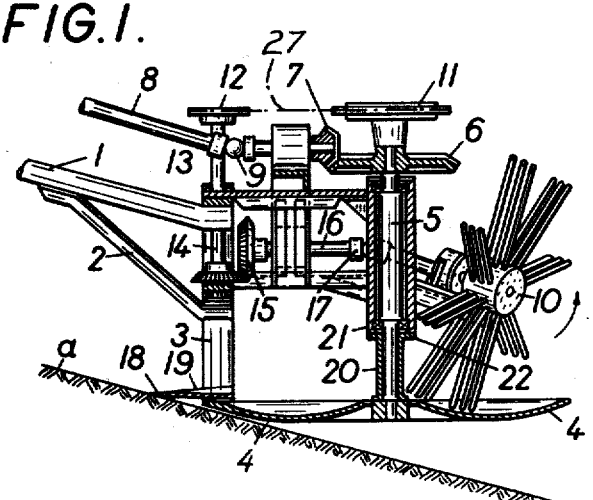
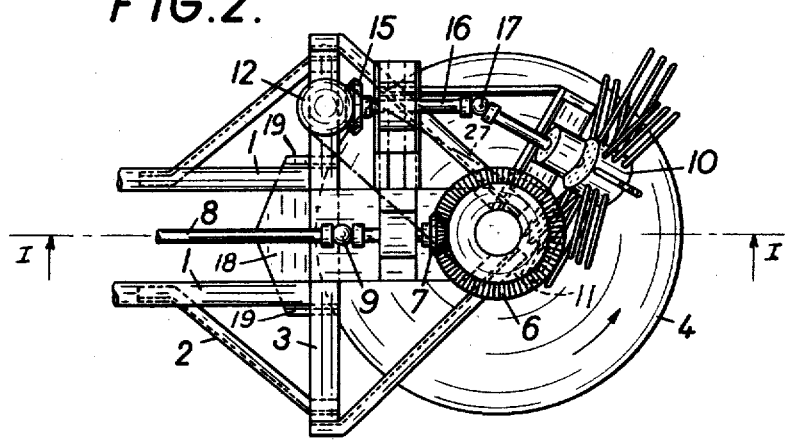
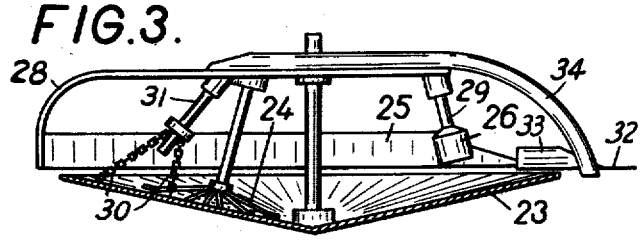

2,876,849

POTATO DIGGERS

Torleif Hüstad, Sandvollan, Norway

Application May 4, 1955, Serial No. 505,989

7 Claims. (Cl. 171—115)

This invention relates to improvements in potato diggers, and more particularly potato diggers of the general type including a share and a rotatable carrier onto which the potatoes are delivered from the share.

Known potato diggers of the type having a share and a throw wheel, by means of which the earth thrown up by the share, together with the potatoes, are thrown out to the side, have the disadvantage that potatoes are thrown in all direcions, and that such diggers encounter difficulties in digging potatoes in wet earth. Furthermore, the potates and earth are often mixed together, so that one must remove a portion of the thrown up potatoes from the thrown up earth.

The main object of the present invention is to avoid the disadvantages referred to and to provide a potato digger which, one the one hand leaves the potatoes on top of the thrown up earth so that they can be easily picked up, and on the other hand leaves the potatoes in one or more rows.

A potato digger according to the invention comprises a frame, a share at the front of the frame, a concave or bowl-shaped circular conveyor disc rotatable on an upright substantially vertical axis operatively associated in back of the share for receiving the potatoes and associated earth therefrom, and a throw wheel located above the carrier wheel toward the rear and including peripherally arranged prongs cooperating with the upper surface of the conveyor disc, the throw wheel being arranged to throw the potatoes and associated earth from the conveyor disc onto the ground to one side of the conveyor disc. In this construction means is provided for rotating the throw wheel in a direction to move the prongs of the wheel toward the periphery of the conveyor disc, the axis of the throw wheel being preferably arranged at an oblique angle to the axis of rotation of the conveyor disc, so that the prong wheel throws the potatoes and earth upwardly and rearwardly in an inclined direction toward one side of the digger.

According to one embodiment of the invention, the rotary disc has an arcuate shape in cross-section between its center and its circumference.

According to another embodiment of the invention, the rotary disc has an inverted conical shape in cross-section.

According to a further feature of the invention, the axis of rotation of the throw wheel is located at an oblique angle to the axis of the rotatable disc, so that the earth is thrown out in an inclined direction relative to the direction of travel of the potato digger.

According to a still further feature of the invention, the rotatable disc is mounted on a shaft driven by a power transmission extending from the tractor used to draw the potato digger, and the throw wheel is mounted on a shaft driven through sprocket wheels and a chain from the shaft on which the rotatable disc is mounted via a further transmission, universal joints being provided in the shaft or shafts included in the different transmissions, for adapting the whole drive arrangement to the unevenness of the ground and to the inclination of the apparatus as a whole relative to the ground during a digging operation.

The improved potato digger of the present invention includes other features and advantages which will appear from the following more detailed description taken in connection with the drawings, in which:

Fig. 1 is a central axial vertical sectional view of a potato digger constructed in accordance with the invention, taken on the line I—I of Fig. 2;

Fig. 2 is a plan view of the potato digger shown in Fig. 1; and

Fig. 3 is a broken view partly in vertical section showing a modified form of rotatable conveyor wheel and throw wheel, the remaining parts of the arrangement being the same as those shown in Figs. 1 and 2.

According to the showing in Figs. 1 and 2, the apparatus includes two tubular thills or traction members 1 which are attached by stays 2 to a main frame 3 of the apparatus. A rotatable disc 4, which, from the center towards the circumference, has a bowl shape or is dished, as appears from the cross-sectional showing in Fig. 1, is carried on a shaft 5 mounted in bearings in the frame 3. The rotatable disc 4 rotates counterclockwise, as illustrated in Fig. 2, with the shaft 5, which is driven by bevel gears 6 and 7 and a shaft 8, from the power output of the tractor. The shaft 8 includes a universal joint 9 located in advance of the gear 7, so connected as to adapt the arrangement to the forwardly inclined position of the apparatus relative to the ground a, as illustrated in Fig. 1, and to the unevenness of the ground.

In the embodiment shown in Figs. 1 and 2, the apparatus includes a throw wheel 10 constructed as a prong wheel which also rotates in a counterclockwise direction, as seen from the rear, and which is driven from the shaft 5 through sprocket wheels 11 and 12 engaged by a chain 27 shown by dot-and-dash lines, a shaft 13 mounted in bearings in the frame 3, bevel gears 14 and 15 and a shaft 16 to which the throw wheel is fixed. The shaft 16 includes a universal joint 17, and the end portion of the shaft carrying the throw wheel 10 is mounted in a bearing carried by the frame 3.

The digging of the potatoes in a row is effected by a share 18 carried by the front of the frame 3 below the members 1. The potatoes and the associated earth, due to the forwardly inclined position of the apparatus, are moved via a chute 19 onto the forward portion of the rotating disc 4. From this point, the mass on the conveyor disc is brought entirely above the surface of the ground by the rotating conveyor disc 4 before it is caught by the pronged throw wheel 10. By the arrangement shown, of rotating the disc 4 and the pronged throw wheel 10 relative to each other, and the mutual direction of rotation, the mass of earth and potatoes is conveyed around to the rear to the pronged throw wheel, and by the latter thrown up into the air. Because the earth associated with the potatoes is more dense than the potatoes, the earth falls onto the ground first and the potatoes are left on top of the earth. The potatoes are, therefore, not covered with the earth thrown off by the throw wheel and can be easily picked up.

Due to the fact that the throw wheel 10, as shown and described, is inclined relative to the axis of the shaft 5, the mass is thrown out in an inclined direction relative to the direction of travel of the potato digger, so that the potatoes are deposited in a row.

The potato digger according to the invention can work in wet earth because of the fact that the mass of potatoes and earth is lifted up to the surface of the ground before being thrown out by the throw wheel.

The lower portion of the shaft 5 above the rotatable disc 4 extends through a protecting sleeve 20 fixed to the member 4. The upper end of the sleeve 20 extends into and runs freely in a lower bearing cover 22 of the bearing pipe 21 surrounding the intermediate portion of the shaft 5, and thus prevents the earth from contacting and wearing the shaft 5.

In Fig. 3 the potato digger includes a conveyor disc 23 having the shape of an inverted hollow cone from its center, or from a central zone toward its circumference. In this view, the throw wheel 24 is in the form of a pronged wheel, the prongs of which by a suitable mutual arrangement of the conveyor disc 23 and the prongs of the throw wheel 24 during the operation of the potato digger, will sweep the inner surface of the disc 23 with their ends and throw the mass of potatoes and earth outwardly in an inclined direction relative to the direction of travel of the potato digger. The potato digger shown in Fig. 3 includes a guard 25 located above and laterally of the rotatable conveyor disc 23, the guard 25 being supported in position by a frame member 28. Any earth adhering to the guard 25 is removed by a rotatable scraper 26 mounted on a shaft 29 extending downwardly from a frame member 28. A share 32 and a chute 33, carried by a forwardly-extending frame member 34, deliver the potatoes and associated earth onto the disc 23. The forward end of the guard 25 is shown attached to one side of the chute 33.

The potato digger as a whole, including the frame, is of simple inexpensive construction, and as a result, is relatively light in weight.

I claim:

1. A potato digger comprising a frame, a share mounted at the front of the frame, a rotatable conveyor mounted on the frame in back of the share in a position for receiving potatoes and associated earth from the share, said rotatable conveyor comprising a circular conveyor disc, concave on its upper side and rotatable on a generally upright forwardly-inclined axis, and a rotatable throw wheel mounted over a portion of the conveyor disc remote from said share in a position to sweep upwardly and outwardly across the concave surface of the conveyor disc and throw off potatoes and associated earth upwardly and in a direction at an angle to the direction of travel of the potato digger, whereby potatoes and associated earth dug up by the share, deposited on said conveyor and conveyed rearwardly and above the level of the earth by the rotation of said conveyor, may be thrown upwardly and away from said digger by the sweeping of said throw wheel upwardly and outwardly across the concave surface of said conveyor disc.

2. A potato digger as claimed in claim 1, in which the throw wheel is a pronged wheel the prongs of which are adapted to sweep across the surface of the conveyor disc toward its periphery as the conveyor disc is rotated.

3. A potato digger as claimed in claim 2, in which the throw wheel is arranged to sweep across the conveyor disc from its central portion to its periphery and generally in the direction of rotation of the conveyor disc.

4. A potato digger as claimed in claim 1, in which the throw wheel is rotatable on an upwardly-inclined axis extending forwardly and outwardly relative to the axis of rotation of the conveyor disc.

5. A potato digger as claimed in claim 1, in which the throw wheel is a pronged wheel the end portions of the prongs of which are arranged to contact and sweep across the conveyor disc toward its periphery, and means for simultaneously rotating the conveyor disc and throw wheel.

6. A potato digger as claimed in claim 1, in which the circular conveyor disc has a downwardly arcuate shape between its center and circumference.

7. A potato digger as claimed in claim 1, in which the circular conveyor disc has a conical shape.

References Cited in the file of this patent
UNITED STATES PATENTS

| 63,475 | Conover | Apr. 2, 1867 |
| 412,491 | Ford | Oct. 8, 1889 |

FOREIGN PATENTS

| 640,165 | Great Britain | July 12, 1950 |
| 703,243 | Great Britain | Feb. 3, 1954 |